United States Patent
Barbier

[11] 3,914,952
[45] Oct. 28, 1975

[54] VALVE CONTROL MEANS AND REFRIGERATION SYSTEMS THEREFOR

[75] Inventor: William J. Barbier, St. Louis, Mo.

[73] Assignee: Sporlan Valve Company, St. Louis, Mo.

[22] Filed: June 26, 1972

[21] Appl. No.: 266,414

[52] U.S. Cl. .............. 62/197; 236/75; 251/139; 251/129; 62/217
[51] Int. Cl.² .................................. F25B 41/04
[58] Field of Search ........... 62/217, 197, 188, 204, 62/210, 218, 222; 251/129, 139; 137/487.5; 236/75

[56] References Cited
UNITED STATES PATENTS

| | | | |
|---|---|---|---|
| 2,863,473 | 12/1958 | Gantz | 251/139 |
| 2,916,252 | 12/1959 | Hobbs et al. | 251/129 |
| 3,003,331 | 10/1961 | Coburn et al. | 62/217 |
| 3,168,242 | 2/1965 | Diener | 236/75 |
| 3,316,731 | 5/1967 | Quick | 62/217 |
| 3,325,139 | 6/1967 | Diener et al. | 251/129 |
| 3,482,816 | 12/1969 | Arnold | 251/129 |
| 3,667,722 | 6/1972 | Katz et al. | 251/129 |
| 3,698,204 | 10/1972 | Schlotterbeck et al. | 62/217 |
| 3,707,992 | 1/1973 | Ellison et al. | 251/129 |
| 3,805,203 | 4/1974 | Deckard | 251/129 |

Primary Examiner—William E. Wayner
Assistant Examiner—Henry C. Yuen

[57] ABSTRACT

A control valve device for refrigeration systems in which a solenoid includes an electromagnetic coil about a plunger and a plug, the plunger and plug having opposed surfaces with a magnetic gap therebetween, and the opposed surfaces having compatible substantially conical shapes. An electrical amplifier circuit is connected to the coil and includes a temperature sensing element positioned to respond to temperature at a selected location in the refrigeration system and thereby correspondingly regulates D.C. voltage applied to the coil and the resultant magnetic field acting on the plunger, the plunger moving a valve member to control flow through a valve located in the system. The substantially conical opposed surfaces of the plunger and plug providing a magnetic gap have an included angle of about 30° to about 60°, and preferably of about 45°. A spring device urges the plunger in one direction, the spring device having force characteristics that approximate the force characteristics of the magnetic field so that the plunger movement is substantially linearly proportional to the change in D.C. voltage.

21 Claims, 5 Drawing Figures

VALVE CONTROL MEANS AND REFRIGERATION SYSTEMS THEREFOR

BACKGROUND OF THE INVENTION

This invention relates generally to control valve devices and refrigeration systems therefor.

There are many devices in existence for controlling refrigeration and cooling systems and the like, and there are many different kinds of refrigeration and cooling systems. There are also many devices and systems in existence which are controlled and operated by pressure and temperature responsive means. The known pressure and temperature responsive means, however, for the most part require relatively substantial pressures and pressure differentials for their operation. They are not capable of maintaining accurate control within a close limitation, are relatively insensitive to small changes, and are relatively complicated and expensive to make, install and adjust. The known devices are not therefore suitable for many applications.

SUMMARY OF THE INVENTION

The present control valve device is capable of maintaining accurate control within a close limitation, is relatively sensitive to small changes of pressure and temperature, is relatively uncomplicated and inexpensive to make, install and adjust. There are several different, yet related refrigeration systems in which the control valve device can be advantageously utilized.

The control valve device includes a solenoid means having an electromagnetic coil about a plunger and an adjacent fixed plug, the plug and plunger having opposed surfaces with a magnetic gap therebetween, the opposed surfaces having compatible substantially conical shapes. An electrical amplifier circuit is connected to the coil and includes a temperature sensing element positioned to respond to temperature at a selected location in the refrigeration system and thereby correspondingly regulate D.C. voltage applied to the coil and the resultant magnetic field acting on the plunger. A valve member is moved in response to the movement of the plunger by the magnetic field and cooperates with a valve seat to control flow through inlet and outlet ports.

The conical opposed surfaces of the plunger and plug have an included angle to move the plunger with a substantially linear action in response to changes in the magnetic field and with sufficient force for effective, quick action in response to small changes in the D.C. voltage applied to the coil. Preferably, the conical opposed surfaces providing the magnetic gap have an included angle of about 30° to about 60° and with an optimum of about 45°.

A spring means urges the plunger in opposition to the force applied to the plunger by the magnetic field. The spring means has force characteristics that substantially approximate the force characteristics of the magnetic field so that the plunger movement is substantially linearly proportional to the change in D.C. voltage.

In one refrigeration system in which the control valve device is effectively utilized, the control valve device is located in the system to control flow through the return line from an evaporator to the fluid supply source. The temperature sensing element of the electrical amplifier circuit is positioned to respond to the temperature of the evaporator and thereby regulate the flow through the evaporator and hence regulate the temperature in the refrigerator or other unit.

A pilot valve means can be provided for controlling the operation of the control valve device when used in the refrigeration system mentioned previously. The pilot valve means includes a chamber having an inlet on one side of a pilot valve seat which communicates to a pressure point in the system higher than the pressure at the downstream side of the valve seat of the control valve device, and having an outlet from the pilot valve chamber on the other side of the pilot valve seat which communicates with the control valve device on one side of the movable valve member of such device. The means for moving the valve member in response to movement of the plunger by the magnetic field includes a pilot piston movable relative to the pilot valve seat to control communication therethrough. The valve member of the control valve device is subjected on opposite sides to a same pressure of the system so that such valve member is substantially balanced by such pressure.

In another refrigeration system utilizing the control valve device in the return line from the evaporator to the fluid supply source, a hot gas bypass line is provided from the fluid supply source at the high side of the system to the low side of the system at the evaporator downstream of the expansion device. A regulator valve means in the bypass line is responsive to the pressure downstream to open when such pressure reaches a predetermined value and thereby pass hot gas to maintain a minimum evaporator pressure and a minimum capacity at all times.

In still another refrigeration system in which there are a plurality of evaporators, a control valve device is connected to each evaporator and a return line connects each control valve device to the fluid supply source. A hot gas bypass line from the source at the high side of the system to the low side of the system upstream of each control valve device, is provided. A bypass valve means is located in each bypass line. Means selectively opens any one of the bypass valve means and closes the associated control valve device to pass hot gas to the associated evaporator for defrost.

DESCRIPTION OF THE PREFERRED EMBODIMENTS

Figure 1:
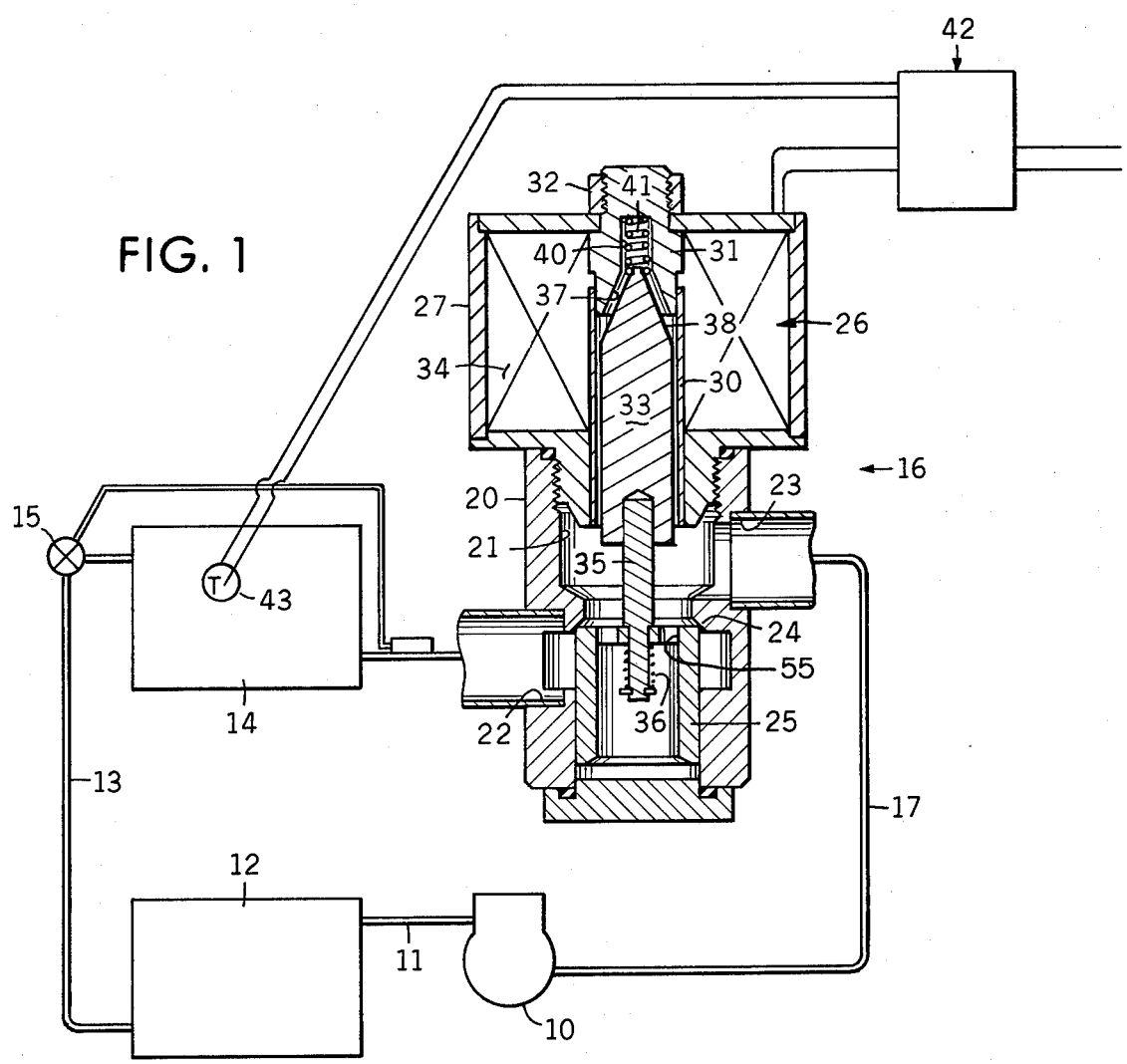
FIG. 1 is a cross sectional view of a control valve means located in a refrigeration system.

Referring now by characters of reference to the drawings, and first to FIG. 1, the control valve means is illustrated in a refrigeration system. The system includes a compressor 10 connected by line 11 to a condenser 12. A feed line 13 connects the condenser 12 to an evaporator 14 through an expansion device 15. The control valve means generally indicated by 16 is connected in the return line 17 between the compressor 10 and the evaporator 14.

The control valve means 16 includes a valve body 20 provided with a chamber 21. An inlet port 22 places the chamber 21 in communication with the outlet of evaporator 14. An outlet port 23 places the chamber 21 in communication with the return line 17. The valve body includes a valve seat 24 in the chamber 21 between the inlet and outlet ports 22 and 23. A valve member 25 is reciprocatively mounted in the valve chamber 21 and cooperates with the valve seat 24 to control flow through the inlet and outlet ports 22 and 23.

A solenoid means generally indicated by 26 includes a housing 27 fixed to the valve body 20. A tubular sleeve 30 is carried by the housing 27 and is open at one end to the chamber 21. A plug 31 is fixed to the housing 27 by nut 32, the plug 31 contacting and closing the other end of sleeve 30. Reciprocatively mounted within the sleeve 30 is a plunger 33. Located within the housing 27 and about the plug 31 and the plunger 33 is an electromagnetic coil 34. The housing 27, plug 31 and plunger 33 are made of ferrous material such as steel.

The means for moving the valve member 25 includes a stem 35 fixed to the plunger 33 and connected to the valve member 25 through a spring 36.

The plug 31 and plunger 33 are provided with opposed surfaces 37 and 38 with a magnetic gap therebetween, the opposed surfaces 37 and 38 having compatible, substantially conical shapes. The plug 31 is provided with a center recess 40 that receives a spring 41. The spring 41 tends to urge the plunger 33 in a direction away from the plug 31.

An electrical amplifier circuit generally indicated by 42 is connected to the coil 34, the circuit including a temperature sensing element 43 positioned at the evaporator 14 to respond to the temperature of the evaporator and thereby correspondingly regulate the D.C. voltage applied to the coil 34 and the resultant magnetic field acting on the plunger 33.

Figure 5:
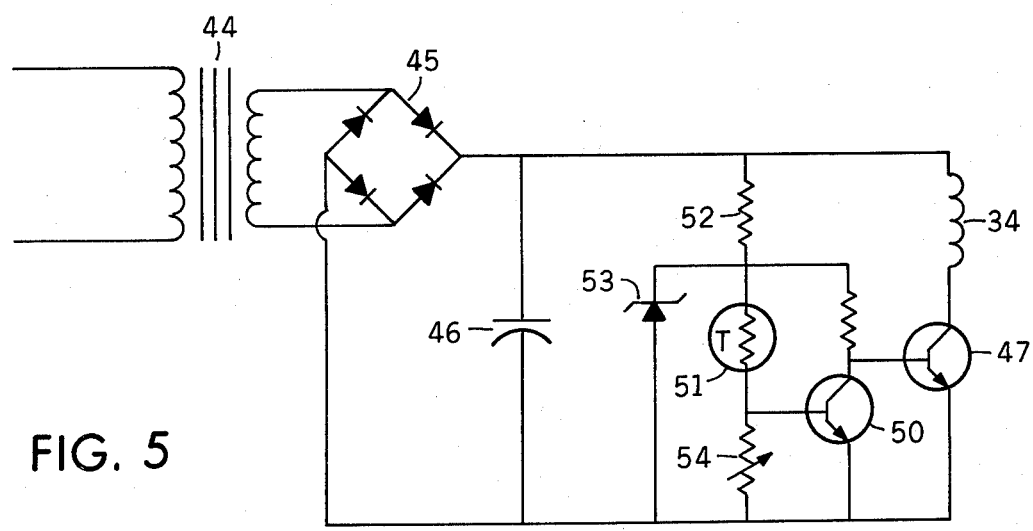
FIG. 5 is a circuit diagram of the amplifier circuit utilized in the control valve means.

The details of the amplifier circuit 42 is best shown in FIG. 5. This circuit modulates D.C. power to a solenoid coil in response to changes in resistance of a thermistor temperature sensing element. The circuit is fed by A.C. line voltage through a transformer 44, the A.C. output voltage of which feeds into a full wave bridge 45 where the A.C. output is converted into a high ripple D.C. The high ripple D.C. then goes through a filtering circuit which consists of a capacitor 46. The solenoid coil 34 is in series circuit with a transistor 47 which modulates the current flow to the primary circuit to vary the position of the valve member 25. To obtain sufficient amplification, two transistors 47 and 50 are used, one transistor piloting the operation of the other. The thermistor 51, constituting a temperature sensing element, is installed as part of a voltage divider network in the base of the transistor 50. With appropriate selection of thermistor 51 and transistors 47 and 50, a total gain of approximately 10,000 can be obtained which is more than sufficient for the accuracy required. Resistor 52 and Zener diode 53 are part of the voltage regulator circuit which helps to reduce the effect of line voltage variations on the output of the circuit to the solenoid coil 34. The provision of a variable resistor 54 in the base circuit of transistor 50 permits a wide range of temperature adjustment.

With a 115 volt A.C. line voltage applied to the circuit and a 24 volt A.C. output from the transformer 44, and with other appropriate selection of parts, a change of 1°F. will vary the D.C. voltage to the solenoid coil 34 from 12 volts to 18 volts which is sufficient to cause the valve to go from the full open to the full closed position.

The included angle of the conical opposed surfaces 37 and 38 of the plug 31 and plunger 33 is selected so that the magnetic field moves the plunger 33 with a substantially linear action in response to changes in the magnetic field and with sufficient force for positive opening and closing of the valve member 25. Optimum operation is obtained with an included angle of 45°. An electromagnetic closing force of 4½ pounds has been achieved at 18 volts. Satisfactory operation has been achieved with an included angle within the range of about 30° to about 60°. Below about 30° included angle, the forces are too low, while above an included angle of about 60°, the stroke is not linear enough.

The spring 41 is selected to have force characteristics that substantially approximate the force characteristics of the magnetic field at the magnetic gap between the opposed conical surfaces 37 and 37 so that the plunger movement is substantially linearly proportional to the change in D.C. voltage.

It will be understood that the valve member 25 is pressure-balanced in that the same pressure is exerted on opposite sides of the valve member 25 as permitted by the passage 55 formed in the valve member 25.

The function of the control valve means 16 in the refrigeration system of FIG. 1 is to reduce refrigerant flow through the return line 17 to prevent the temperature being controlled from going below the circuit set point. The expansion device 15 maintains the coil temperature difference required for cooling. Typically, the expansion device 15 will be a thermostatic expansion valve, although other devices can be used.

When the ambient temperature of the evaporator 14 sensed by the thermistor 43 falls below a predetermined value, the thermistor 43 acting through the amplifier circuit 42 causes an increase in D.C. voltage applied to the electromagnetic coil 34 and thereby causes a corresponding increase in the force of the electromagnetic field produced by such coil across the magnetic gap between the conical opposed surfaces 37 and 38 of the plug 31 and plunger 33. This magnetic force tends to move the plunger 33 linearly toward the plug 31 against the linear action of spring 41, thereby moving the valve member 25 in a direction toward the valve seat 24 to reduce the refrigerant flow through the return line 17.

Consequently, the evaporator pressure, and hence its temperature, is raised. When the evaporator pressure rises, the thermostatic expansion valve 15 throttles to maintain its evaporator outlet superheat setting. The action of the control valve means 16 causes a following action by the thermostatic expansion valve 15.

One of the primary markets for this control valve means 16 will be in meat coolers where a minimum amount of drying out of the meat is desired. As the control valve means 16 closes, it raises the evaporator pressure (and its temperature) to reduce cooling, which results in a minimum dehumidification of the meat.

In air conditioning work, where dehumidification work is desirable, the thermostatic expansion valve 15 must be equipped with a maximum operating pressure to prevent the evaporator pressure (and its temperature) from exceeding a value low enough to insure some amount of coil surface with a temperature that will provide the desired level of dehumidification.

Figure 2:
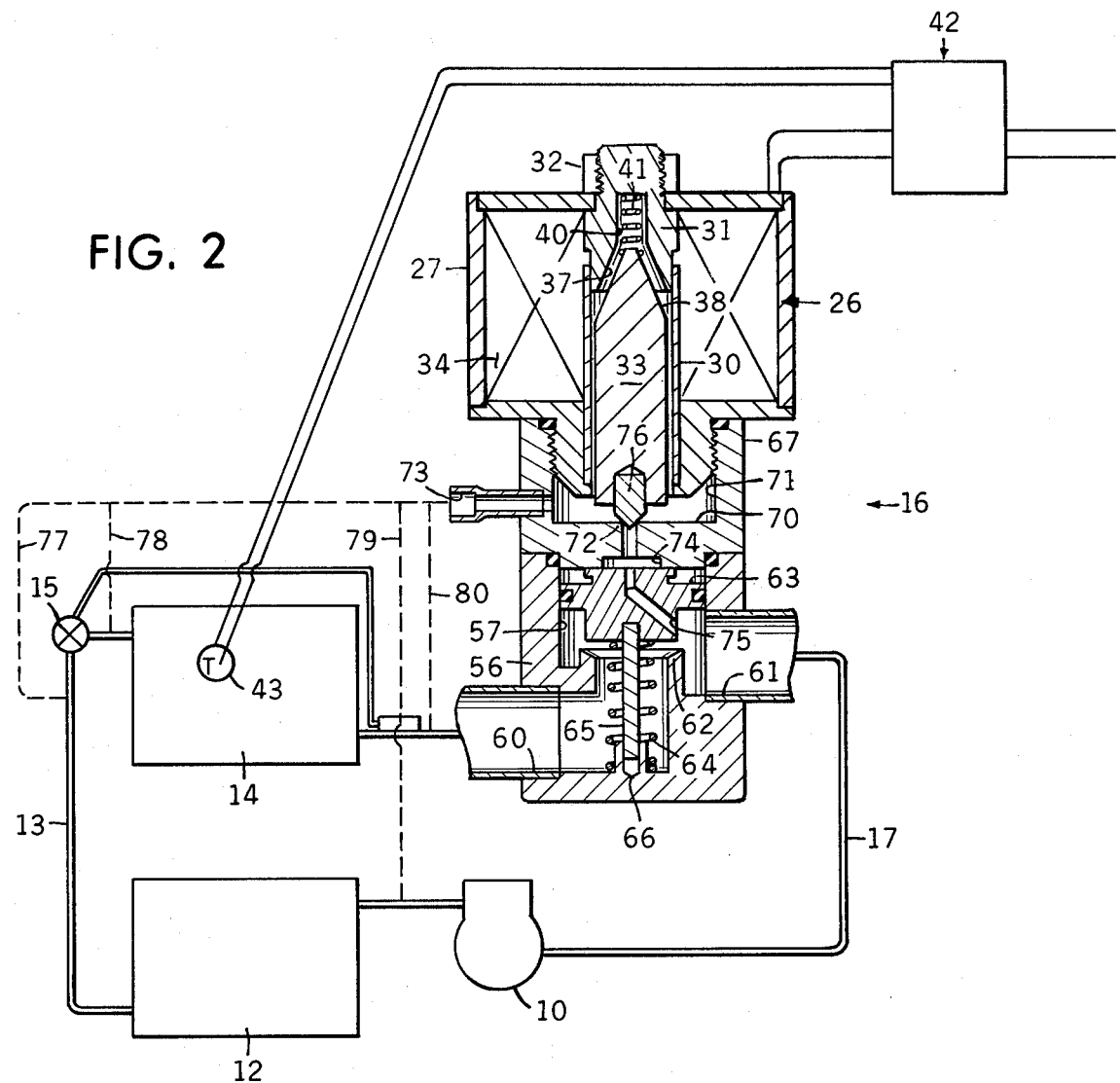
FIG. 2 is a cross sectional view of a pilot-operated control valve means connected in another refrigeration system.

A pilot valve means for controlling the operation of the control valve means 16, and the system in which pilot-operated valve means is utilized, is illustrated in FIG. 2. This control valve means 16 of FIG. 2 includes a valve body 56 having a chamber 57 with an inlet 60 and an outlet 61. The valve body 56 includes a valve seat 62 between the inlet 60 and outlet 61. A valve member 63 is reciprocatively mounted in the chamber 57. A spring 64, located about a guide rod 65, tends to urge the valve member 63 in a direction away from the valve seat 62. The guide rod 65 is carried by the valve member 63 and is reciprocatively received in a compatible socket 66.

The pilot valve means includes a body 67 carried by the valve body 56 and includes a partition 70 that closes the chamber 57 and provides a stop against which the valve member 63 is urged in its fully opened position. The pilot body 67 is provided with a chamber 71 having a valve seat 72 therein. An inlet 73 is provided to the chamber 71 at one side of the pilot valve seat 72. An outlet from the pilot valve chamber 71 on the other side of the pilot valve seat 72 communicates with the control valve means on one side of the movable valve element 63. A passage 75 subjects opposite sides of the valve member 63 to the same pressure to provide a pressure-balanced valve member 63.

The solenoid means 26 and the amplifier circuit 42 are the same as that previously described with respect to FIG. 1, and the component parts are given the same reference numbers. The means for moving the valve member 63 in response to movement of the plunger 33 by the magnetic field includes a pilot piston 76 carried by the plunger 33 and movable relative to the pilot valve seat 72 to control communication therethrough. The inlet 73 to the pilot chamber 71 communicates to a pressure point in the system higher than the pressure at the downstream side of the valve seat 62 of the control valve means 16. For example, in FIG. 2, the broken lines 77 through 80 indicate possible connections, namely, (1) to the feed line 13 upstream of the expansion device 15, (2) at the inlet to the evaporator 14, (3) to the line between the compressor 10 and the condenser 12, and (4) to the evaporator outlet upstream of the control valve means 16, respectively.

In operation, when the thermistor 43 senses that the ambient temperature of the evaporator 14 has dropped below a predetermined value, the thermistor 43 acting through the amplifier circuit 42 causes an increase in the D.C. voltage applied to the coil 26 and thereby increases the force of the magnetic field across the magnetic gap between the conical surfaces 37 and 38 of the plug 31 and plunger 33 respectively. The plunger 33 will move in a direction so that the pilot piston 76 opens the pilot port defined by the pilot seat 72. The high upstream pressure flows through the pilot port into the valve chamber 57 at one side of the valve member 63, thereby causing the valve member to move in a direction toward its valve seat 62 to reduce the refrigerant flow through the return line 17.

Figure 3:
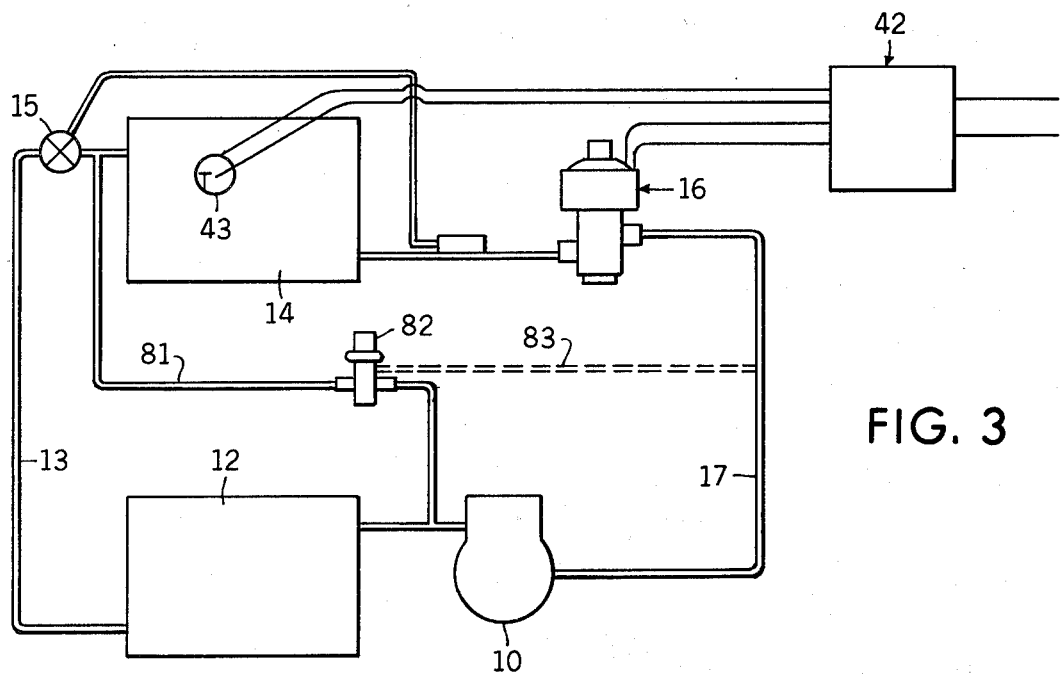
FIG. 3 is another refrigeration system using the control valve means of FIG. 1.

FIG. 3 illustrates a refrigeration system having a single evaporator and a hot gas bypass line. The system of FIG. 3 is similar to that illustrated in FIG. 1, but has a bypass line 81 connecting the high side of the system between the compressor 10 and condenser 12 to the evaporator inlet between the expansion device 15 and evaporator 14.

A regulator valve 82 of the type disclosed in U.S. Pat. No. 3,402,566 dated Sept. 24, 1968 is located in the bypass line 81. This regulator valve 82 is responsive to a pressure downstream to open when such pressure reaches a predetermined value and thereby passes hot gas to the evaporator inlet to maintain a minimum evaporator pressure and a minimum capacity at all times. As disclosed in U.S. Pat. No. 3,402,566, the regulator valve 82 can be either internally or externally equalized. This means that the valve 82 can either sense the pressure directly at its outlet or a pressure which is downstream but remote from the outlet of the valve. An external equalizer line 83 is shown as a possible external connection between the regulator valve 82 and the return line 17.

The control valve means 16 is not intended to modulate the system capacity to zero because (1) some cooling gas must be returned to the compressor of any hermetic motor, (2) it is not desirable to operate the suction line of the compressor in a vacuum, (3) low suction pressures can cause excessive discharge gas temperature, and (4) the unit will short cycle continuously if the valve attempts to throttle below the setting of a low pressure switch. These problems are solved in the system of FIG. 3 in that hot gas is bypassed into the low side to provide a minimum amount of capacity at all times.

A hot gas bypass is also desirable in water chillers and the like where protection from freeze-up is required. The hot gas bypass regulator valve 82 senses the evaporator pressure and is adjusted to bypass whenever the pressure in the evaporator approaches a pressure equivalent to 30°F.

Figure 4:
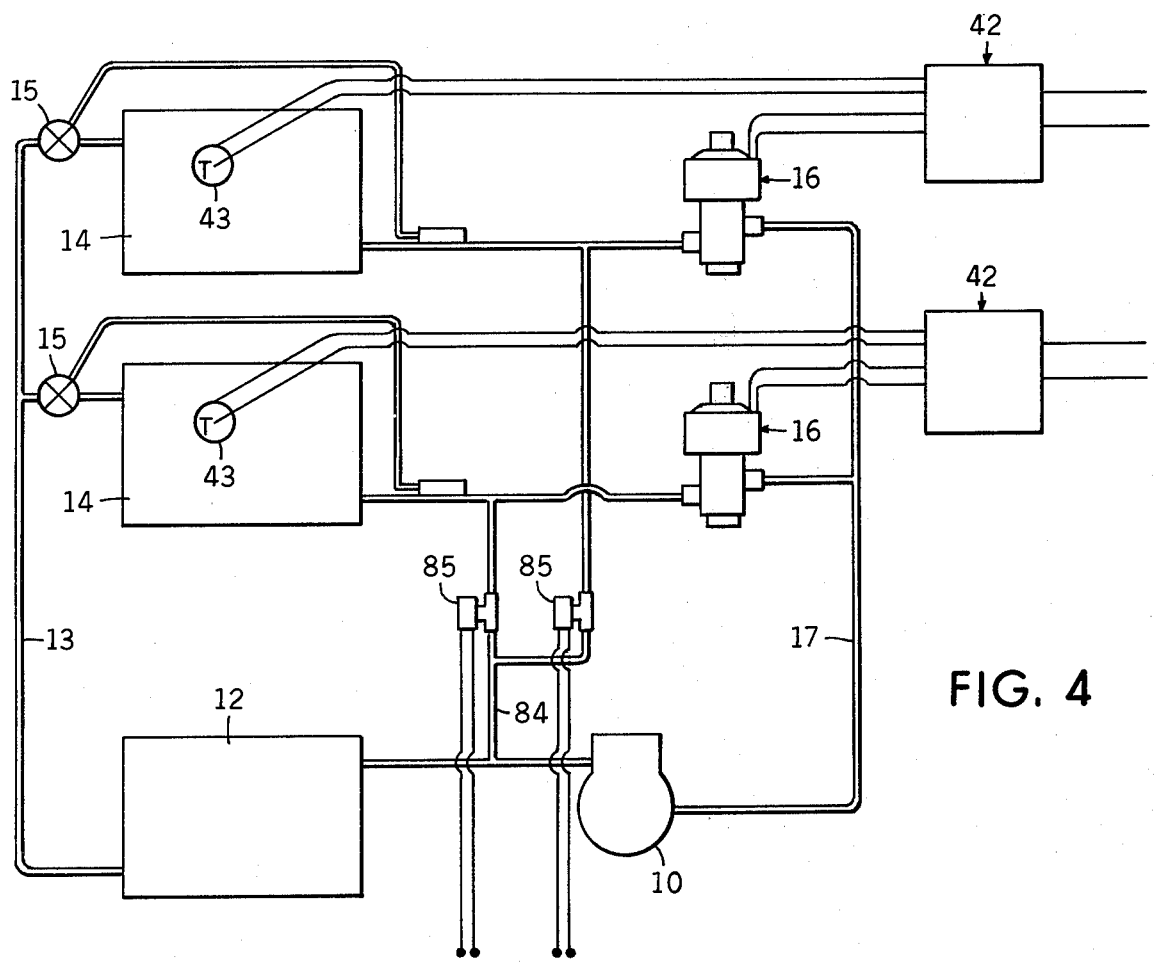
FIG. 4 is still another refrigeration system incorporating a plurality of control valve means of FIG. 1.

Another refrigeration system in which the control valve means 16 is utilized, is shown in FIG. 4. This system utilizes a multiplicity of evaporators and a hot gas defrost feature. In heretofore conventional applications where gas defrost is used, an expensive and complicated three-way valve must be used to shut off the suction line of the coil being defrosted and also provide passage for the hot gas into the evaporator outlet. This three-way valve has been eliminated by the system of FIG. 4.

In the system of FIG. 4, there are a plurality of evaporators 14. A control valve means 16 is connected to the outlet of each evaporator 14. The feed line 13 connects the condenser 12 to each of the evaporators 14 through an expansion device 15. The return line 17 connects each control valve means 16 to the compressor 10. A bypass line 84 communicates the high side of the system between the compressor 10 and the condenser 12 to the low side of the system at each evaporator outlet and upstream of each control valve means 16. A simple two-way solenoid valve 85 is located in the bypass line to each evaporator outlet. Means is provided for selectively opening any one of the solenoid valves 85 and closing the associated control valve means 16 to pass hot gas to the associated evaporator 14 for defrost. The suction at each evaporator outlet can be closed off by electrically placing the associated control valve means 16 in a closed position. This can be done simply by opening the thermistor circuit of the associated amplifier circuit 42. the operating mode is accomplished by the use of a combined normally open, normally closed relay with the control valve means 16 on the normally closed contact set and the solenoid valve 85 on the normally open contact set. A defrost-sequencing mode timer or other ice sensor will apply power to the relay to open the thermistor circuit and close the solenoid circuit as required.

I claim as my invention:

1. A control valve means for refrigeration systems, comprising:
   a. a valve body provided with:
      1. a chamber,
      2. an inlet port to the chamber and an outlet port from the chamber, and
      3. a valve seat in the chamber between the inlet and outlet ports,
   b. a valve member movable in the chamber and cooperating with the valve seat to control flow through the inlet and outlet ports,
   c. a solenoid means including:
      1. a movably mounted elongate plunger,
      2. a fixed plug located adjacent to and outwardly of one end of the plunger,
      3. an electromagnetic coil about the plunger and plug, and
      4. the said one plunger end having a substantially conical continuous surface extending inwardly from the plunger periphery toward said end, the fixed plug having a substantially conical continuous surface that is compatible with and opposed to the plunger surface to provide a single magnetic gap therebetween,
   d. an electrical amplifier circuit connected to the coil and including a temperature sensing element positioned to respond to temperature at a selected location in the refrigeration system and thereby correspondingly regulate D.C. voltage applied to the coil and the resultant magnetic field acting on the plunger,
   e. means for moving the valve member in response to movement of the plunger by the magnetic field,
   f. a spring means urging the plunger, the spring means having force characteristics that substantially approximates the force characteristics of the magnetic field, and
   g. the substantially conical opposed surfaces of the plunger and plug providing the single magnetic gap have an included angle so that a change in the input D.C. voltage to the coil will produce a substantially linear change in the position of the plunger.

2. A control valve means as defined in claim 1, in which:
   h. the substantially conical opposed surfaces of the plunger and plug providing the single magnetic gap have an included angle of about 30° to about 60°.

3. A control valve means as defined in claim 1, in which:
   h. The substantially conical opposed surfaces of the plunger and plug providing the single magnetic gap have an included angle of about 45°.

4. A control valve means as defined in claim 1, in which:
   h. means subjects opposite sides of the valve member to the same pressure to provide a pressure-balanced valve member,
   i. the spring means tends to urge the plunger so that the valve member moves in one direction relative to the valve seat,
   j. the magnetic field in a response to an incresae in magnetic force across the single gap upon a corresponding increase in D.C. voltage applied to the coil, tends to urge the plunger so that the valve member moves in the other direction to the valve seat.

5. A refrigeration system, comprising:
   a. a fluid supply source,
   b. an evaporator,
   c. an expansion device connected to the evaporator for maintaining evaporator temperature difference required for cooling,
   d. a feed line connecting the expansion device to the source,
   e. a return line back to the source from the evaporator,
   f. a control valve means for controlling flow through the return line from the evaporator to the source to prevent the temperature being controlled from going below a predetermined value, the control valve means including:
      1. a valve seat in the return line,
      2. a valve member movable relative to the seat to control flow through the return line,
      3. a solenoid means including a movably mounted elongate plunger, a fixed plug located adjacent one end of the plunger, and electromagnetic coil about the plunger and plug, the said one plunger end having a substantially conical continuous surface extending inwardly from the plunger periphery toward said end, the fixed plug having a substantially conical continuous surface that is compatible with and opposed to the plunger surface to provide a single magnetic gap therebetween,
      4. an electrical amplifier circuit connected to the coil and including a temperature sensing element positioned to respond to the temperature of the evaporator and thereby correspondingly regulate the D.C. voltage applied to the coil and the resultant magnetic field acting on the plunger,
      5. means for moving the valve member in response to movement of the plunger by the magnetic field,
   g. a spring means tending to urge the plunger, the spring means having force characteristics approximating the force characteristics of the magnetic field, and
   h. the substantially conical opposed surfaces of the plunger and plug providing the single magnetic gap have an included angle so that a change in the input D.C. voltage to the coil will produce a substantially linear change in the position of the plunger.

6. A refrigeration system as defined in claim 5, in which:
   i. the substantially conical opposed surfaces of the plunger and plug providing the single magnetic gap have an included angle of about 30° to about 60°.

7. A refrigeration system as defined in claim 5, in which:
   i. the substantially conical opposed surfaces of the plunger and plug providing the single magnetic gap have an included angle of about 45°.

8. A refrigeration system as defined in claim 5, in which:

i. means subjects opposite sides of the valve member to the same pressure to provide a pressure-balanced valve member, j. the spring means tends to urge the plunger so that the valve member moves in one direction relative to the valve seat, and k. the magnetic field in response to an increase in magnetic force across the single gap upon a corresponding increase in D.C. voltage applied to the coil, tends to urge the plunger so that the valve member moves in the other direction relative to the valve seat.

9. A refrigeration system as defined in claim 5, in which:

i. the means for moving the valve member in response to movement of the plunger includes a pilot valve means including:
  1. a chamber having a valve seat therein,
  2. an inlet to the chamber on one side of the pilot valve seat,
  3. means communicating the inlet to a pressure point in the system higher than the pressure at the downstream side of the valve seat of the first said control valve means,
  4. an outlet from the pilot valve chamber on the other side of the pilot valve seat communicating with the first said control valve means on one side of the movable valve member, and
  5. a pilot piston carried by the plunger and movable relative to the pilot valve seat to control communication therethrough, and j. means for subjecting opposite sides of the valve member to the same pressure to provide a pressurebalanced valve member.

10. A refrigeration system as defined in claim 9, in which:

k. the substantially conical opposed surfaces of the plunger and plug providing the magnetic gap have an included angle of about 30° to about 60°.

11. A refrigeration system as defined in claim 9, in which:

k. the substantially conical opposed surfaces of the plunger and plug providing the magnetic gap have an included angle of about 45°.

12. A refrigeration system as defined in claim 9, in which:

k. a sleeve receives the movable plunger, l. a housing embraces the coil and operatively contacts the plug, m. a second spring means tends to urge the valve member in the said other direction relative to the valve seat, and n. the magnetic field in response to an increase in magnetic force across the gap upon a corresponding increase in D.C. voltage applied to the coil, tends to urge the plunger so that the pilot piston moves in one direction relative to the pilot valve seat to regulate the pressure on the said one side of the movable valve member.

13. A refrigeration system as defined in claim 5, in which:

i. a hot gas bypass line extends from the fluid supply source at the high side of the system to the low side of the system at the evaporator downstream of the expansion device, and j. a regulator valve means is provided in the bypass line and responsive to a pressure downstream to open when said pressure reaches a predetermined value and thereby pass hot gas to maintain a minimum evaporator pressure and a minimum capacity at all times.

14. A refrigeration system as defined in claim 13, in which:

k. means is provided for subjecting the regulator valve means to a signal pressure from the return line downstream of the control valve means.

15. A refrigeration system as defined in claim 13, in which:

k. the substantially conical opposed surfaces of the plunger and plug providing the magnetic gap have an included angle of about 30° to about 60°.

16. A refrigeration system as defined in claim 13, in which:

k. the substantially conical opposed surfaces of the plunger and plug providing the magnetic gap have an included angle of about 45°.

17. A refrigeration system as defined in claim 13, in which:

k. means subjects opposite sides of the valve member to the same pressure to provide a pressure-balanced valve member, l. a sleeve receives the movable plunger, and m. a housing embraces the coil and operatively contacts the plug.

18. A refrigeration system as defined in claim 5, in which:

i. there are a plurality of said evaporators, j. there is an expansion device connected to each evaporator, k. there is a feed line connecting the source to each expansion device, l. there is a control valve means connected to each evaporator, m. there is a return line connecting each control valve means to the source, n. each control valve means has its valve seat in the return line from the associated evaporator, and its temperature sensing element is positioned to respond to the temperature of the associated evaporator, o. a hot gas bypass line extends from the source of the highside of the system to the lowside of the system upstream of each control valve means, p. bypass valve means is provided in each bypass line, and q. means is provided for selectively opening any one of the bypass valve means and closing the associated control valve means to pass hot gas to the associated evaporator for defrost.

19. A refrigeration system as defined in claim 18, in which:

r. the substantially conical opposed surfaces of the plunger and providing the magnetic gap have an included angle of about 30° to about 60°.

20. A refrigeration system as defined in claim 18, in which:

r. the substantially conical opposed surfaces of the plunger and plug providing the magnetic gap have an included angle of about 45°.

21. A refrigeration system as defined in claim 18, in which:

r. means subject opposite sides of the valve member to the same pressure to provide a pressure-balanced valve member, s. a sleeve receives the movable plunger, and t. a housing embraces the coil and operatively contacts the plug.

* * * * *